(12) United States Patent
Kemppainen et al.

(10) Patent No.: US 11,240,808 B2
(45) Date of Patent: Feb. 1, 2022

(54) METHOD AND ARRANGEMENT FOR IDENTITY COLLECTION

(71) Applicant: EXFO Oy, Oulu (FI)

(72) Inventors: Jukka Kemppainen, Oulu (FI); Hannu Toppinen, Oulu (FI)

(73) Assignee: EXFO OY, Oulu (FI)

( * ) Notice: Subject to any disclaimer, the term of this patent is extended or adjusted under 35 U.S.C. 154(b) by 88 days.

(21) Appl. No.: 16/946,102

(22) Filed: Jun. 5, 2020

(65) Prior Publication Data

US 2021/0258956 A1 Aug. 19, 2021

Related U.S. Application Data (60) Provisional application No. 62/976,416, filed on Feb. 14, 2020.

(51) Int. Cl.
*H04W 72/04* (2009.01)
*H04W 8/24* (2009.01)
*H04W 88/08* (2009.01)
*H04W 84/04* (2009.01)

(52) U.S. Cl.
CPC ......... *H04W 72/0453* (2013.01); *H04W 8/24* (2013.01); *H04W 72/042* (2013.01); *H04W 88/08* (2013.01); *H04W 84/042* (2013.01)

(58) Field of Classification Search
CPC ... H04W 72/0453; H04W 8/24; H04W 88/08; H04W 72/042; H04W 84/042
USPC .................................................. 370/328, 329
See application file for complete search history.

(56) References Cited

U.S. PATENT DOCUMENTS

| 8,175,601 | B2 | 5/2012 | Engstrom |
| 8,543,128 | B2 | 9/2013 | Jen |
| 9,167,456 | B2 * | 10/2015 | Kemppainen ......... H04W 12/02 |
| 9,451,395 | B2 | 9/2016 | Kwak et al. |
| 9,781,137 | B2 | 10/2017 | Szucs et al. |
| 9,867,039 | B2 | 1/2018 | Wang et al. |
| 9,876,655 | B2 | 1/2018 | Lan et al. |
| 9,949,125 | B2 | 4/2018 | Hahn et al. |

(Continued)

FOREIGN PATENT DOCUMENTS

| EP | 2733973 B1 | 3/2016 |
| WO | 2019213946 A1 | 11/2019 |

OTHER PUBLICATIONS

3GPP specification 38.104 v15.7.0 (235 pages).

(Continued)

*Primary Examiner* — Congvan Tran
(74) *Attorney, Agent, or Firm* — Buchanan Ingersoll & Rooney PC (57) ABSTRACT

Methods and arrangements are disclosed for collecting subscriber identity. A cell is formed for carrying out communications with mobile devices. A channel bandwidth indication is transmitted and indicates to cellular mobile devices the formed cell utilizes bandwidth identical to the bandwidth utilized in neighboring real cells. A downlink radio channel power level on a given continuous channel subset of the indicated channel bandwidth is provided. A communication request from a cellular mobile device is received and radio resources allocated to the cellular mobile device from the given continuous channel subset of the indicated channel bandwidth. A subscriber identity of the cellular mobile device is received from the cellular mobile device.

16 Claims, 3 Drawing Sheets

(56) References Cited

U.S. PATENT DOCUMENTS

| | | |
|---|---|---|
| 9,955,506 B2 | 4/2018 | Rahman et al. |
| 10,200,861 B2 | 2/2019 | Nair et al. |
| 2013/0003695 A1* | 1/2013 | Nylander ........ H04W 36/00837 |
| | | 370/331 |
| 2015/0163794 A1 | 6/2015 | Liang et al. |
| 2017/0078895 A1* | 3/2017 | Sriram ................ H04W 24/10 |
| 2018/0013568 A1 | 1/2018 | Muhanna et al. |
| 2018/0367998 A1 | 12/2018 | Kunz et al. |
| 2019/0132740 A1 | 5/2019 | De et al. |
| 2019/0246442 A1 | 8/2019 | Park et al. |
| 2019/0349765 A1 | 11/2019 | Kolekar et al. |
| 2019/0393997 A1* | 12/2019 | Futaki .................... H04L 5/001 |
| 2021/0235264 A1* | 7/2021 | Kolekar ............... H04L 12/189 |

OTHER PUBLICATIONS

Patent Search Report by Cardinal Intellectual Property, dated Mar. 6, 2020. (23 pages).

The extended European Search Report dated Jul. 7, 2021, by the European Patent Office in corresponding European Application No. 21155699.8. (5 pages).

* cited by examiner

METHOD AND ARRANGEMENT FOR IDENTITY COLLECTION

FIELD

The invention relates generally to collecting the identity of a subscriber terminal in use and specifically to an apparatus, and a method for performing the identity collection.

BACKGROUND

Collection of identities of cellular mobile devices is useful, when authorities need to locate a lost person who carries a cellular mobile phone or when they need to collect evidence of cellular device communication, for example. This is typically achieved using fake cellular base stations to which the cellular mobile devices connect. During connection setup, the identity of the mobile device may be detected and collected.

There are various cellular communication systems in use in the world. Example of communication systems comprise Global system for mobile communication GSM, General Packet Radio Service GPRS, Enhanced General Packet Radio Service EGPRS, Wideband Code Division Multiple Access WCDMA, The universal mobile telecommunications system UMTS, Long term evolution LTE, Long term evolution advanced LTE-A, New radio NR or 5G, to name a few.

As technology advances, the systems may utilize radio resources in a different manner. For example, commercial LTE networks use 1.4, 3, 5, 10 or 20 MHz radio frequency, RF, bandwidth. Typically, 20 MHz RF bandwidth is used by LTE networks to provide the highest possible speed and to provide service to a large number of LTE User Equipment, UE, at the same time. Fake cellular base stations used by authorities can use the same or smaller bandwidth than the commercial cellular network. An example of prior art solutions is disclosed in US9167456.

Solutions working in earlier communication system do not necessarily operate optimally in new developing communication systems such as in 5G, or NR.

BRIEF DESCRIPTION

The present invention seeks to provide an improved method and an improved arrangement for collecting identities of cellular mobile devices.

According to another aspect of the present invention, there is provided an apparatus comprising a transceiver, a power amplifier and a processor configured to control the transceiver and the power amplifier to form a cell for carrying out uplink and downlink communication with cellular mobile devices, the cell having a physical cell identity and a tracking area code unused by neighboring real cells of a communication system, transmit channel bandwidth indication which indicates to cellular mobile devices the formed cell utilizes bandwidth identical to the bandwidth utilized in neighboring real cells, provide a downlink radio channel power level on a given continuous channel subset of the indicated channel bandwidth, the power level being higher than downlink radio channel power level utilized in real neighboring real cells, receive a communication request from a cellular mobile device, allocate radio resources to the cellular mobile device from the given continuous channel subset of the indicated channel bandwidth and receive a subscriber identity of the cellular mobile device sent from the cellular mobile device.

According to an aspect of the present invention, there is provided a method for identity collection of a cellular mobile device, the method comprising: forming a cell for carrying out uplink and downlink communication with cellular mobile devices, the cell having a physical cell identity and a tracking area code unused by neighboring real cells of a communication system; transmitting channel bandwidth indication which indicates to cellular mobile devices the formed cell utilizes bandwidth identical to the bandwidth utilized in neighboring real cells; providing a downlink radio channel power level on a given continuous channel subset of the indicated channel bandwidth, the power level being higher than downlink radio channel power level utilized in real neighboring real cells; receiving a communication request from a cellular mobile device; allocating radio resources to the cellular mobile device from the given continuous channel subset of the indicated channel bandwidth and receiving a subscriber identity of the cellular mobile device sent from the cellular mobile device.

In an embodiment, the processor of the apparatus is configured to control the transceiver and the power amplifier further to support communication with cellular mobile devices on bandwidth identical to the bandwidth utilized in neighboring real cells; and allocate majority of the downlink radio channel power on the given continuous channel subset.

In an embodiment, the transceiver and the power amplifier of the apparatus are configured to communicate with cellular mobile devices only on the given continuous channel subset and the processor of the apparatus is configured to control allocate all the downlink radio channel power on the given continuous channel subset.

In an embodiment, the communication system the neighboring real cells belong to is Long term evolution LTE, Long term evolution advanced LTE-A or New radio NR communicating system.

In an embodiment, the processor of the apparatus is configured to control the transceiver and the power amplifier further to transmit channel bandwidth indication within the given continuous channel subset.

In an embodiment, the processor of the apparatus is configured to control the transceiver and the power amplifier further to scan neighboring real cells of the communication system to obtain information on the communication system, and form the cell at least partly based on the obtained information.

In an embodiment, the obtained information comprises at least one of radio technology, frequency, bandwidth, subcarrier spacing, physical cell identifier, tracking area code, mobile network code, mobile country code, downlink power level.

In an embodiment, the processor of the apparatus is configured to control the transceiver and the power amplifier further to form a cell using one of a random tracking area code and a tracking area code unused in said operation area.

In an embodiment, the processor of the apparatus is configured to control the transceiver and the power amplifier further to form a cell using one of a random physical cell identification and a physical cell identification unused in said operation area.

In an embodiment, the apparatus further comprises a memory, the processor being configured to store the received subscriber identity of the cellular mobile device into the memory.

In an embodiment, the bandwidth of the continuous channel subset is different than the bandwidths specified for radio frequency bands of the communication system.

The embodiments and features described in this specification that do not fall under the scope of the independent claims are to be interpreted as examples useful for understanding various embodiments of the invention.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention.

Communication systems are developed in international co-operation with network manufactures, operators, and national telecommunication authorities. 5G or New Radio, or NR, is one new communication systems in development by 3GPP (3rd Generation Partnership Project (3GPP). In the first phase, 5G or NR will operate in connection with 4G communication network, but in near future also standalone 5G or NR networks will emerge on the market.

Each cellular mobile device, user terminal (or user equipment, UE) hardware has unique identifier. The identifier may be denoted as the permanent equipment identifier, PEI, or international mobile equipment identifier, IMEI.

A cellular mobile device wishing to utilize services of a wireless communication system such as a cellular network, needs to have a subscription from the operator of the communication system. Typically, a subscription is bounded to a physical Universal Subscriber Identity Module, USIM, card and the subscription can be identified by a unique subscription permanent identifier, SUPI, denoted also an international mobile subscriber identity, IMSI. SUPI consists of the mobile country code (MCC), mobile network code (MNC), and the mobile subscription identification number (MSIN).

There are also so-called embedded USIMs or electronic SIMs, eSIM, available. An eSIM is a digital USIM that allows the owner to activate a subscription to a communication system without having to use a physical USIM card.

To protect unauthorized use of IMSI, in many cellular systems an alternate value that a cellular mobile device can use instead of the IMSI (whenever possible) to access the system network is used. This alternate identification is denoted Globally Unique Temporary Identifier GUTI. Unlike an IMSI, a GUTI is not permanent and is changed into a new value whenever generated.

In 5G systems, security specifications do not allow plain-text transmissions of SUPI over the radio interface. Instead, an encrypted identifier containing the concealed SUPI is transmitted. This concealed SUPI is known as SUCI (Subscription Concealed Identifier).

In the development of communication systems, the trend is to increase capacity and minimize latency, for example. For this reason, the channels and bandwidths used in the new systems may be different than in the older systems. For example, in 5G the channels and bandwidth may be different compared to earlier 4G. 3GPP specifications define that 5G UEs can support RF bandwidth from 5 MHz to 100 MHz but 5 MHz RF bandwidth is not supported in all RF bands. Especially in new RF bands introduced for NR, 5 MHz RF bandwidth is not specified.

3GPP specification 38.104 v15.7.0, incorporated herein by reference, defines different NR channel bandwidth requirements in different RF bands. For example, in the band n77 (3300-4200 MHz), n78 (3300-3800 MHz) and n79 (4400-5000 MHz), the following BS (base station) channel bandwidths are possible:

TABLE 1

| NR band/SCS/BS channel bandwidth | | | | | | | | | | | | | | |
|---|---|---|---|---|---|---|---|---|---|---|---|---|---|---|
| NR Band | SCS kHz | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
| n77 | 15 | | Yes | Yes | Yes | | Yes | Yes | Yes | | | | | |
| | 30 | | Yes | Yes | Yes | | Yes | Yes | Yes | Yes | Yes | Yes | Yes | Yes |
| | 60 | | Yes | Yes | Yes | | Yes | Yes | Yes | Yes | Yes | Yes | Yes | Yes |
| n78 | 15 | | Yes | Yes | Yes | | Yes | Yes | Yes | | | | | |
| | 30 | | Yes | Yes | Yes | | Yes | Yes | Yes | Yes | Yes | Yes | Yes | Yes |
| | 60 | | Yes | Yes | Yes | | Yes | Yes | Yes | Yes | Yes | Yes | Yes | Yes |
| n79 | 15 | | | | | | | Yes | Yes | | | | | |
| | 30 | | | | | | | Yes | Yes | Yes | | Yes | | Yes |
| | 60 | | | | | | | Yes | Yes | Yes | | Yes | | Yes |

Table 1 illustrates base station channel bandwidths and subcarrier spacing, SCS, per operating band in Frequency Range 1, FR1. The missing "Yes" in the 5 MHz column means that the 5 MHz RF bandwidth is not supported in the bands n77, n78 and n79. In addition, the specification 38.104 specifies that if the sub carrier spacing of a NR cell is 30 kHz or 60 kHz, the cell cannot use 5 MHz RF bandwidth.

Using narrower bandwidths in fake cellular base stations have several advantages. A narrower bandwidth enables to build physically smaller devices which are easier to transport and also simplifies the structure of the devices. Further, as the transmission power of the power amplifier of the fake base station is directed to the continuous channel subset instead of the wider bandwidth, it is possible to obtain higher the downlink radio channel power level in the continuous channel subset than downlink radio channel power level utilized in real neighboring real cells which transmit utilizing wider bandwidth.

Figure 1:
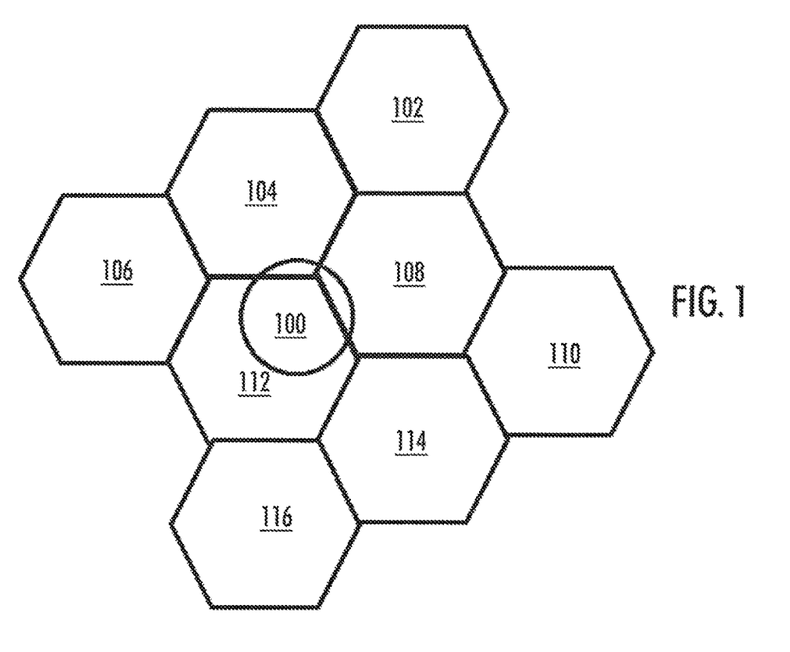
FIG. 1 illustrates an example of the operation area of a network operator.

FIG. 1 shows an example of the operation area of a network operator, where a cell 100 created by a fake base station is within the area covered by cells 102, 104, 106, 108, 110, 112, 114, 116 created by base stations of the network operator. The fake base station is configured to utilize the same radio technology as the cells of the network operator. Cellular mobile devices in the area see the cell provided by the fake base station as another one of the operator cells. However, the cell of the fake base station is not a part of the cellular operator network. The cells created by the real cellular base stations 102 to 116 support a given base station channel bandwidth defined by the network operator. Further, the operator network provides cells 102 to 116 in the operation area with a downlink radio channel power level.

Figure 2:
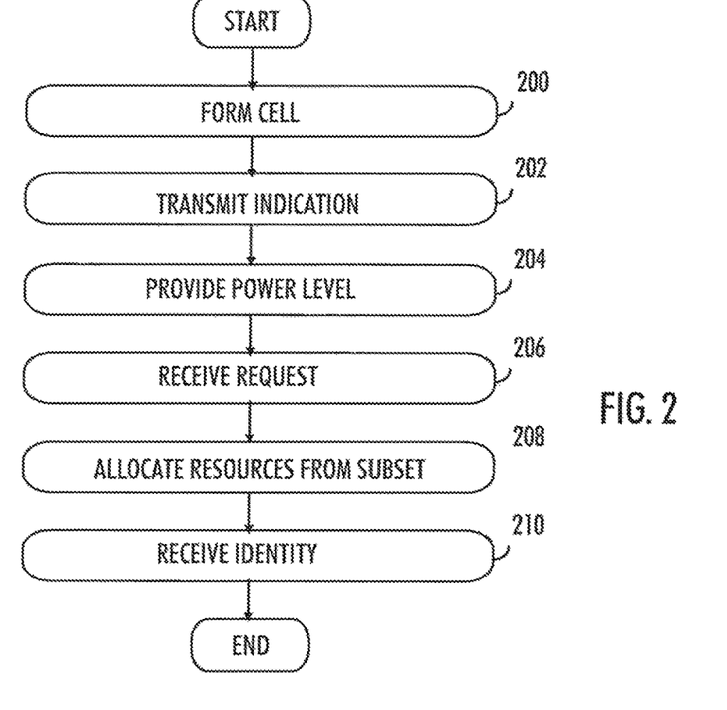
FIG. 2 is a flowchart illustrating an embodiment.

FIG. 2 is a flowchart illustrating an embodiment. The flowchart illustrates the operation of an apparatus which may be a fake base station or a part of a fake base station.

In step 200, the apparatus is configured to form a cell 100 for carrying out downlink and uplink communication with cellular mobile devices, the cell having a physical cell identity and a tracking area code unused by neighboring real cells of a communication system.

In an embodiment, the communication system the neighboring real cells belong is Long term evolution LTE, Long term evolution advanced LTE-A or New radio NR communicating system. However, the proposed solution is not limited to the mentioned systems, but it may also be applied in other communication systems.

In an embodiment, prior forming the cell the apparatus may be configured to scan neighboring real cells of the communication system to obtain information on the communication system and form the cell at least partly based on the obtained information.

In an embodiment, the obtained information comprises at least one of radio technology, frequency, bandwidth, subcarrier spacing, physical cell identifier, tracking area code, mobile country code MCC, mobile network code MNC, downlink power level.

In an embodiment, the apparatus uses one of a random tracking area code and a tracking area code unused in said operation area when forming the cell.

In an embodiment, the apparatus uses one of a random physical cell identification and a physical cell identification unused in said operation area when forming the cell.

Thus, in an embodiment, forming a cell comprises the activation of the transceiver of the fake base station using the radio technology, frequency, bandwidth, subcarrier spacing, MCC and MNC scanned from the cells of the network operation in the area. To make the fake base station attractive to cellular mobile devices, the transceiver uses the tracking area code which is either random or not used in the operator cells. The transceiver uses the physical cell identification which is either random or not used in this area to avoid interference with the cells of the network operator.

In step 202, the apparatus is configured to transmit channel bandwidth indication which indicates to cellular mobile devices that the formed cell utilizes bandwidth identical to the bandwidth utilized in neighboring real cells.

In step 204, the apparatus is configured to provide a downlink radio channel power level on a given continuous channel subset of the indicated channel bandwidth, the power level being higher than downlink radio channel power level utilized in real neighboring real cells. The higher power level is measured by the cellular mobile devices in the area. Typically, cellular mobile devices tend to make a handover to the cell which provides a higher downlink radio channel power level than the other cells in the area.

In an embodiment, when the fake base station is active and a cell has been formed, a power amplifier of the fake base station is activated. This increases the downlink power level of the fake base station. When a cellular mobile device is in the operating range of the fake base station, the downlink radio channel power level provided to the channel subset as measured by the cellular mobile device is higher than the operator downlink power level as measured by the cellular mobile device.

In an embodiment, when the fake base station is active, it starts broadcasting in the formed cell system information, SI, which includes the downlink power level and cell bandwidth indication. Cellular mobile devices in the area use the downlink power level information for estimating correct uplink power level for the connection request. Cellular mobile devices do not send connection requests to a cell if a cell uses a base station channel bandwidth not supported by the cellular mobile devices.

In an embodiment, the fake base station uses the power amplifier to increase the radio frequency, RF, power of the downlink channels. The majority of the RF power of the power amplifier may be used for amplifying the subset of the cell bandwidth used by the fake base station. As a result, when a cellular mobile device is in the operating range of the fake base station, from the cellular mobile device point of view, the effective RF power of the fake base station is higher compared to the situation where the same power amplifier would be used for amplifying the full bandwidth.

In step 206, the apparatus is configured to receive a communication request from a cellular mobile device.

When cellular mobile devices present in the area detect that the cell 100 of the fake base station has higher power level than the surrounding cells 102 to 116 of the network operator and the tracking area code of the fake base station is different than that of the operator cells, they may start sending a connection request to the fake base station. The higher downlink radio channel power level is attractive to the cellular mobile devices. The fake base station will then receive the connection request 206 from the cellular mobile device.

In step 208, the apparatus is configured to allocate downlink radio resources to the cellular mobile device from the given continuous channel subset of the indicated channel bandwidth.

Using the radio resources, the fake base station may be configured to send a cellular identity request to the cellular mobile device.

In step 210, the apparatus is configured to receive a subscriber identity of the cellular mobile device sent from the cellular mobile device.

As the request transmitted by the fake base station is normal behavior for any base station, real or fake, the cellular mobile device will provide its cellular identity, such as its International Mobile Subscriber Identity IMSI, International Mobile Equipment Identity IMEI, Globally Unique Temporary Identifier GUTI or Subscription Concealed Identifier SUCI. The fake base station receives the cellular identity of the cellular mobile device and stores it. The identity of the mobile device has been collected. In an embodiment, as part of the storing of the identity, a timestamp associated to the step of receiving the subscriber identity can also be stored. Additionally, a location of the fake base station associated to the step of receiving the identity can also be stored.

Once the subscriber identity is collected, it can be used for monitoring and analytics and/or communicated to a separate system (not shown) for further processing.

Further, once the subscriber identity is collected, the fake base station may maintain the connection for a while longer or simply transmit a reject and disconnect message to the cellular mobile device. Having received a reject message, the behavior of the cellular mobile device depends on the parameters of the reject and disconnect message, operator specific configuration on the SIM card/eSIM of the device and implementation of the cellular mobile device. For example, the cellular mobile device can try to connect to another cellular base station of the same or different cellular radio technology or try to connect to the fake base station again.

In an embodiment, the fake base station may be configured to return to a standby state where it is awaiting to receive connection requests from mobile devices. As will be readily understood, multiple cellular mobile devices can be connected to the fake base station at once.

Figure 3:
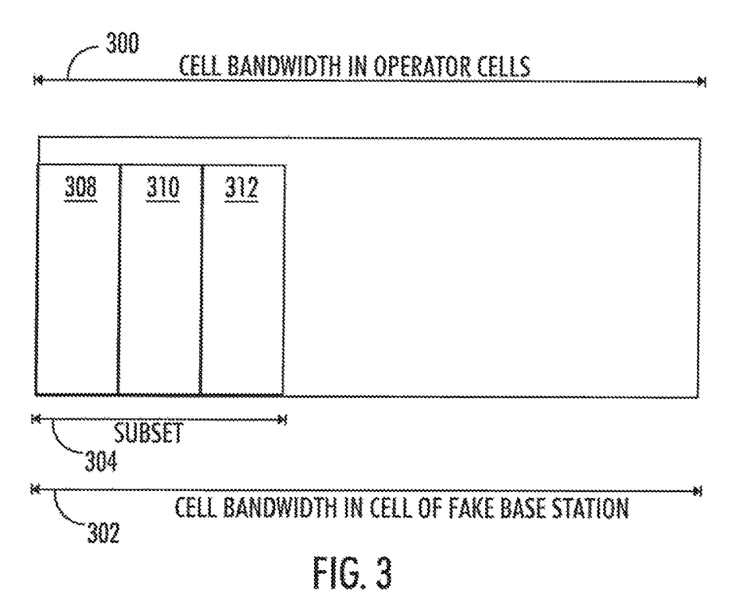
FIG. 3 illustrates an example of bandwidth usage.

FIG. 3 illustrate an example of bandwidth usage. The figure shows the cell bandwidth of operator cells and the cell bandwidth of a fake base station. Cells created by base stations of the network operator utilize the maximum cell bandwidth 300 allocated to the network operator by the regulator. An example of such a bandwidth is 40 MHz. The cell created by the fake base station indicates to the cellular mobile devices that it supports the same cell bandwidth 302 as the operator cells but it is configured to allocate radio resource blocks (RB 308, RB 310, RB 312) to cellular mobile devices only from the subset 304 of the cell bandwidth. In an embodiment the subset has the bandwidth of 5 MHz. The fake cellular base station supports flexible base station channel bandwidth which allows to allocate resources from a continuous channel subset of the base station channel bandwidth.

Thus in an embodiment, the bandwidth of the continuous channel subset is different than the bandwidths specified for radio frequency bands of the communication system. For example, the fake base station may utilize a 5 MHz bandwidth in communication with the mobile devices although it is not supported by the operator cells and the mobile devices.

Figure 4A:
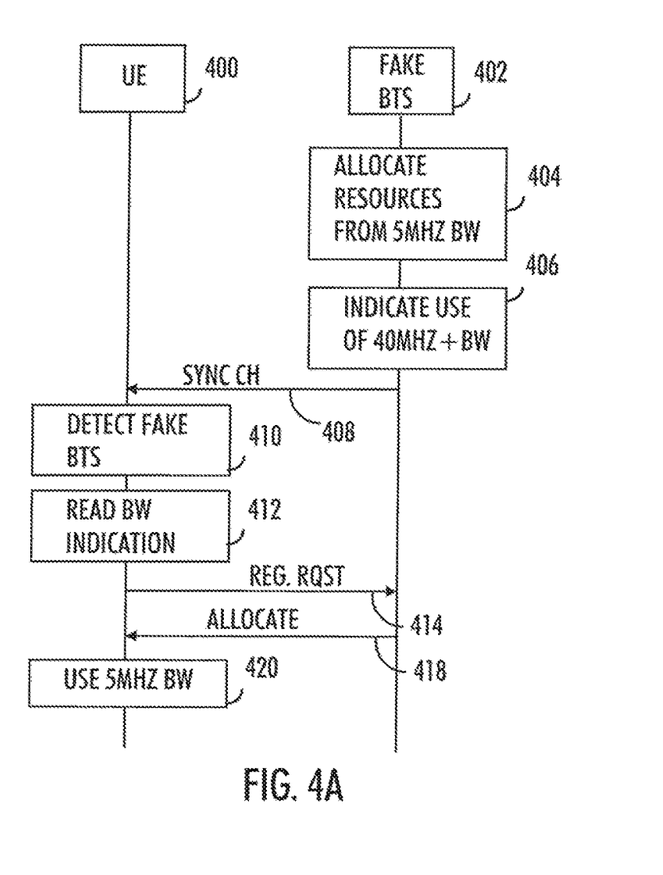
FIGS. 4A and 4B are signaling charts illustrating some embodiments.
Figure 4B:
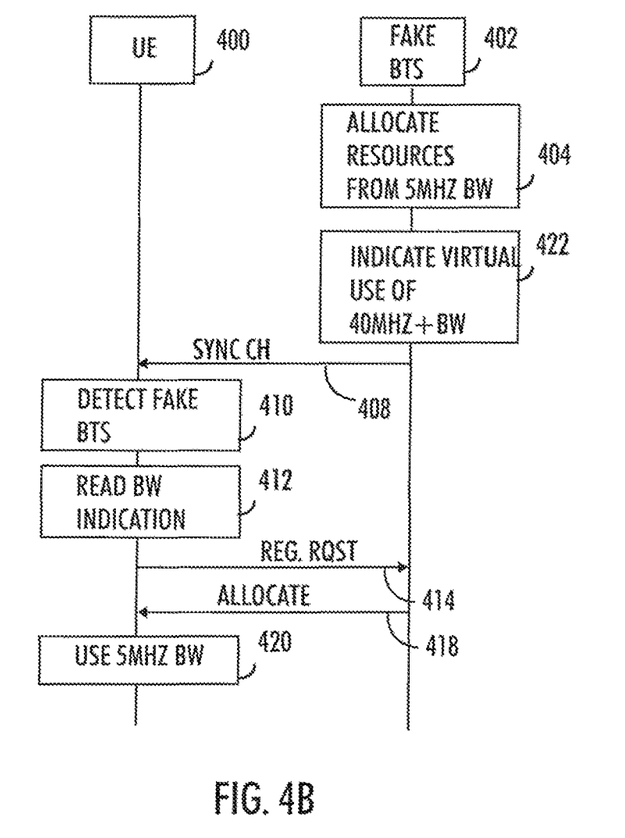

FIGS. 4A and 4B are signaling charts illustrating some embodiments of communication between a cellular mobile device 400 and a fake base station 402.

The example of FIG. 4A illustrates an embodiment when NR Standalone gNBs of a network operator use 40 MHz RF bandwidth and a fake gNB inside the operator network uses the same bandwidth but allocates radio resources only from a 5 MHz RF bandwidth.

In step 404 the fake gNB 402 (acting as a NR standalone gNB) is configured to use a modified mac layer which allocates radio resources from 5 MHz RF bandwidth.

In step 406 the fake gNB 402 is configured to use 40 MHz (or higher) RF bandwidth used in the surrounding cells of a network operator.

Next the fake gNB 402 is configured to broadcast the synchronization channel 408 comprising channel bandwidth indication which indicates to cellular mobile devices that the cell utilizes bandwidth identical to the bandwidth utilized in neighboring real cells.

In step 410 the 5G NR cellular mobile device 400 in a Standalone mode searches for NR Standalone cells and detects the fake gNB by finding the synchronization channel of the gNB.

In step 412 the 5G NR cellular mobile device reads bandwidth indication from System Information Block Type 1, SIB1, from the fake gNB 402 transmission and notices that the gNB uses 40 MHz RF bandwidth.

The 5G NR cellular mobile device 400 is compatible with the 40 MHz RF bandwidth but does not support 5 MHz bandwidth in this RF band. The 40 MHz indication of the fake gNB informs the cellular mobile device that it can request a connection to the gNB.

The 5G NR cellular mobile device starts Registration Request procedure 414 with the gNB.

The fake gNB allocates 418 radio resources (DL/UL resources) to the cellular mobile device 400 within the 5 MHz part of the 40 MHz RF bandwidth.

In step 420 the 5G NR cellular mobile device uses radio resources only inside the 5 MHz RF bandwidth. The cellular mobile device is configured to transmit identification to the fake gNB.

The method described in FIG. 4A works with all 5G cellular mobile devices because the base station decides/controls which radio resources are used by each mobile device.

The example of FIG. 4B illustrates an embodiment when NR Standalone cells of operator network use 40 MHz RF bandwidth and a fake gNB inside the operator network use only from a 5 MHz RF bandwidth but broadcasts system information with the 40 MHz RF information. Part of the steps and signals are the same as in FIG. 4A and are denoted with the same reference number.

In step 404 the fake gNB 402 (acting as a NR standalone gNB) is configured to use a modified mac layer which allocates radio resources from 5 MHz RF bandwidth.

In step 422 the fake gNB 402 is configured to use virtual 40 MHz bandwidth indication. Thus, it indicates to the cellular mobile devices that it uses the 40 MHz bandwidth, but the fake gNB supports only 5 MHz subset for communication.

Next the fake gNB is configured to broadcast the synchronization channel 408 comprising channel bandwidth indication which indicates to cellular mobile devices that the cell utilizes bandwidth identical to the bandwidth utilized in neighboring real cells.

In step 410 the 5G NR cellular mobile device 400 a Standalone mode searches for NR Standalone cells and detects the fake gNB by finding the synchronization channel of the gNB.

In step 412 the 5G NR cellular mobile device reads bandwidth indication from System Information Block Type 1, SIB1, from the fake gNB 402 transmission and notices that the gNB indicates that it uses 40 MHz RF bandwidth.

The 5G NR cellular mobile device 400 is compatible with the 40 MHz RF bandwidth but does not support 5 MHz bandwidth in this RF band. The 40 MHz indication of the fake gNB informs the cellular mobile device that it can request a connection to the gNB.

The 5G NR cellular mobile device starts Registration Request procedure 414 with the gNB.

The fake gNB allocates 418 radio resources (DL/UL resources) to the cellular mobile device 400 within the 5 MHz part of the 40 MHz RF bandwidth.

In step 420 the 5G NR cellular mobile device uses radio resources only inside the 5 MHz RF bandwidth. The cellular mobile device is configured to transmit identification to the fake gNB.

The example of FIG. 4B utilizes the feature of NR specifications that allow a gNB to define location of synchronization signal (SSB) within the bandwidth defined for the gNB. Thus, the fake gNB, which indicates to the cellular mobile devices that it supports the 40 MHz band, may place the synchronization channel within the 5 MHz subset that it in reality supports.

The same applies for the gNB of FIG. 4A as well. Although it supports the whole 40 MHz band, it may place the synchronization channel within the 5 MHz subset.

When these methods are used, the PA connected to the fake gNB increases the effective downlink power level of gNB compared to the case where the same PA is connected to the gNB using the full 40 MHz or 100 MHz RF bandwidth.

The above examples of FIGS. 4A and 4B are examples of how some example embodiments can be realized but there are also other alternatives. For example, NR specifications define the concept of Bandwidth Parts. A fake gNB could command each cellular mobile device to use the Initial Bandwidth Part which is inside the 5 MHz subset of the 40 MHz available bandwidth.

Figure 5:
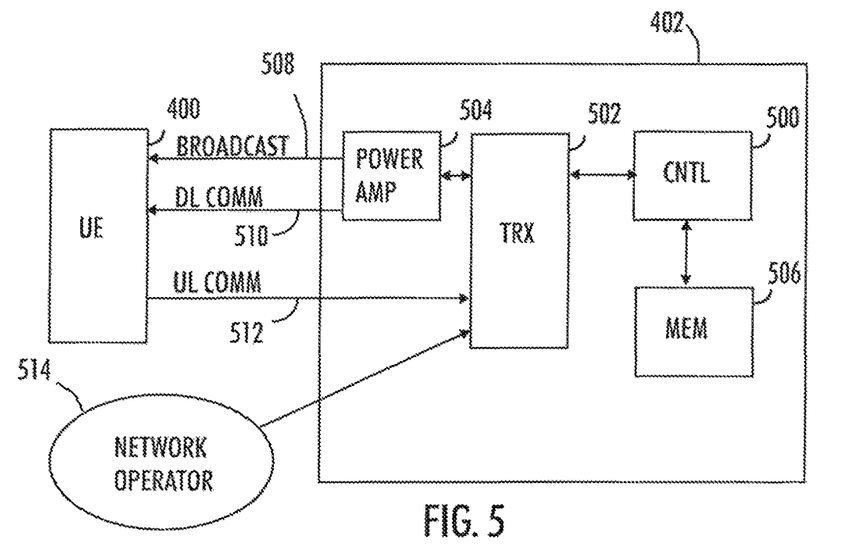
FIG. 5 illustrates an example of an apparatus in which some embodiments may be realized.

FIG. 5 illustrates an example of an apparatus in which some embodiments may be realized. The figure shows a block diagram of an apparatus which may be a fake base station or a part of a fake base station.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus comprises a controller or control circuitry 500. In an embodiment, the controller is realized with a processor or other circuitry performing corresponding actions. The apparatus further comprises a transceiver 502 operationally connected to the controller 500, a power amplifier 504 operationally connected to the transceiver 502 and a memory or identity storage 506 operationally connected to the controller 500.

The memory 506 may store data. In an embodiment, identities of cellular mobile devices are stored in the memory. Furthermore, the memory may store software executable by the controller or processor 500. The memory may be integrated in the controller or processor 500.

The transceiver 502 may be configured to scan the network 514 maintained by a network operator to obtain information about the network before the fake base station 402 is activated. In an embodiment, the obtained information comprises at least one of radio technology, frequency, bandwidth, subcarrier spacing, physical cell identifier, tracking area code, mobile network code, mobile country code, downlink power level. Once activated, the fake base station 402 may broadcast system information 508 via the power amplifier 504. It is configured to provide downlink communication 510 and receive uplink communication 512 to/from a cellular mobile device or User Equipment (UE) 400. The controller or processor 500 controls the network scanning and the identity collection process using the transceiver 502, the power amplifier 504 and the identity storage 506. The controller or processor 500 is also configured to handle cellular protocol messages used in uplink 512 and downlink 510 communications with the cellular mobile device or User Equipment 400.

In an embodiment, the controller 500, transceiver 502 and power amplifier 504 are configured to form a cell 100 for carrying out uplink and downlink communication with cellular mobile devices, the cell having a physical cell identity and a tracking area code unused by neighboring real cells of a communication system.

In an embodiment, the controller 500, transceiver 502 and power amplifier 504 are configured to transmit channel bandwidth indication which indicates to cellular mobile devices that the formed cell utilizes bandwidth identical to the bandwidth utilized in neighboring real cells.

In an embodiment, the controller 500, transceiver 502 and power amplifier 504 are configured to provide a downlink radio channel power level on a given continuous channel subset of the indicated channel bandwidth, the power level being higher than downlink radio channel power level utilized in real neighboring real cells.

In an embodiment, the controller 500 and transceiver 502 are configured to receive a communication request from a cellular mobile device.

In an embodiment, the controller 500 is configured to allocate radio resources to the cellular mobile device from the given continuous channel subset of the indicated channel bandwidth.

In an embodiment, the controller 500 and transceiver 502 are configured to receive a subscriber identity of the cellular mobile device sent from the cellular mobile device. The subscriber identity may be stored in the memory 506.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiments.

In an embodiment, an apparatus comprises means for forming a cell for carrying out uplink and downlink communication with cellular mobile devices, the cell having a physical cell identity and a tracking area code unused by neighboring real cells of a communication system; means for transmitting channel bandwidth indication which indicates to cellular mobile devices that the formed cell utilizes bandwidth identical to the bandwidth utilized in neighboring real cells; means for providing a downlink radio channel power level on a given continuous channel subset of the indicated channel bandwidth, the power level being higher than downlink radio channel power level utilized in real neighboring real cells, means for receiving a communication request from a cellular mobile device, means for allocating radio resources to the cellular mobile device from the given continuous channel subset of the indicated channel bandwidth; and means for receiving a subscriber identity of the cellular mobile device sent from the cellular mobile device.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   a transceiver;
   a radio frequency power amplifier; and
   a processor configured to control the transceiver and the power amplifier to form a cell for carrying out uplink and downlink communication with cellular mobile devices, the cell having a physical cell identity and a tracking area code selectable as being unused by neighboring real cells of a communication system, wherein the processor is configured to:
   transmit a channel bandwidth indication to indicate to cellular mobile devices that the formed cell utilizes a bandwidth identical to a bandwidth utilized in neighboring real cells;
   provide a downlink radio channel power level on a given continuous channel subset of the channel bandwidth indication, the downlink radio channel power level being selectable to be higher than a downlink radio channel power level utilized in real neighboring real cells;
   receive a communication request from a cellular mobile device;
   allocate radio resources to the cellular mobile device from the given continuous channel subset of the channel bandwidth indication; and
   receive a subscriber identity of the cellular mobile device sent from the cellular mobile device.

2. The apparatus of claim 1, wherein the processor configured to:
   control the transceiver and the radio frequency power amplifier is configured to support communication with cellular mobile devices on a bandwidth identical to a bandwidth utilized in neighboring real cells; and
   allocate a majority of the downlink radio channel power on the given continuous channel subset.

3. The apparatus of claim 1, wherein the transceiver and the power amplifier are configured to:
   communicate with cellular mobile devices only on the given continuous channel subset, the processor being configured to allocate all the downlink radio channel power on the given continuous channel subset.

4. The apparatus of claim 1, configured for operation with a communication system of neighboring real cells configured for Long term evolution LTE, Long term evolution advanced LTE-A or New radio NR communicating system.

5. The apparatus of claim 1, wherein the processor is configured to:
   control the transceiver and the power amplifier to transmit a channel bandwidth indication within the given continuous channel subset.

6. The apparatus of claim 1, wherein the processor is configured to:
control the transceiver and the power amplifier to scan neighboring real cells of the communication system to obtain information on the communication system; and
form the cell at least partly based on the obtained information.

7. The apparatus of claim 6, wherein the obtained information comprises at least one of:
radio technology, frequency, bandwidth, subcarrier spacing, physical cell identifier, tracking area code, mobile network code, mobile country code, or downlink power level.

8. The apparatus of claim 1, wherein the processor is configured to:
control the transceiver and the power amplifier to form a cell using one of a random tracking area code and a tracking area code selectable as being unused in an operation area, and using one of a random physical cell identification and a physical cell identification selected as being unused in said operation area.

9. The apparatus of claim 1, wherein the bandwidth of the given continuous channel subset is selectable to be different than bandwidths specified for radio frequency bands of a communication system.

10. A method for identity collection of a cellular mobile device, the method comprising:
forming a cell for carrying out uplink and downlink communication with cellular mobile devices, the cell having a physical cell identity and a tracking area code unused by neighboring real cells of a communication system;
transmitting a channel bandwidth indication which indicates to cellular mobile devices the formed cell utilizes bandwidth identical to a bandwidth utilized in neighboring real cells;
providing a downlink radio channel power level on a given continuous channel subset of the indicated channel bandwidth, the power level being higher than a downlink radio channel power level utilized in real neighboring real cells;
receiving a communication request from a cellular mobile device;
allocating radio resources to the cellular mobile device from the given continuous channel subset of the channel bandwidth indication; and
receiving a subscriber identity of the cellular mobile device sent from the cellular mobile device.

11. The method of claim 10, comprising:
supporting communication with cellular mobile devices on bandwidth identical to the bandwidth utilized in neighboring real cells; and
allocating a majority of the downlink radio channel power on the given continuous channel subset.

12. The method of claim 10, comprising:
communicating with cellular mobile devices only on the given continuous channel subset and allocating all the downlink radio channel power on the given continuous channel subset.

13. The method of claim 10, wherein the bandwidth of the given continuous channel subset is different than bandwidths specified for radio frequency bands of the communication system.

14. The method of claim 10, comprising:
scanning neighboring real cells of the communication system to obtain information on the communication system;
forming the cell at least partly based on the obtained information.

15. The method of claim 14, wherein the obtained information comprises at least one of:
radio technology, frequency, bandwidth, subcarrier spacing, physical cell identifier, tracking area code, mobile network code, mobile country code, or downlink power level.

16. A non-transitory computer readable medium comprising program instructions for causing a computer apparatus to perform at least the following:
forming a cell for carrying out uplink and downlink communication with cellular mobile devices, the cell having a physical cell identity and a tracking area code selectable as being unused by neighboring real cells of a communication system;
transmitting a channel bandwidth indication to indicate to cellular mobile devices the formed cell utilizes a bandwidth identical to a bandwidth utilized in neighboring real cells;
providing a downlink radio channel power level on a given continuous channel subset of the channel bandwidth indication, the power level being selectable to be higher than a downlink radio channel power level utilized in real neighboring real cells;
receiving a communication request from a cellular mobile device;
allocating radio resources to the cellular mobile device from the given continuous channel subset of the channel bandwidth indication; and
receiving a subscriber identity of the cellular mobile device sent from the cellular mobile device.

* * * * *